(12) United States Patent
Cassanego

(10) Patent No.: US 9,071,785 B2
(45) Date of Patent: Jun. 30, 2015

(54) ADJUSTING PERSPECTIVE DISTORTION OF AN IMAGE

(71) Applicant: Gradeable, Inc., Cambridge, MA (US)

(72) Inventor: Dante Cassanego, Cambridge, MA (US)

(73) Assignee: Gradeable, Inc., Boston, MA (US)

(*) Notice: Subject to any disclaimer, the term of this patent is extended or adjusted under 35 U.S.C. 154(b) by 200 days.

(21) Appl. No.: 13/769,260

(22) Filed: Feb. 15, 2013

(65) Prior Publication Data
US 2014/0232891 A1 Aug. 21, 2014

(51) Int. Cl.
*G06K 9/40* (2006.01)
*H04N 1/387* (2006.01)
*G06K 9/32* (2006.01)

(52) U.S. Cl.
CPC ........ *H04N 1/387* (2013.01); *G06K 2009/3225* (2013.01)

(58) Field of Classification Search
None
See application file for complete search history.

(56) References Cited

U.S. PATENT DOCUMENTS

| | | | | |
|---|---|---|---|---|
| 4,449,201 A * | 5/1984 | Clark | | 345/561 |
| 5,001,769 A | 3/1991 | Reid-Green et al. | | |
| 5,815,595 A | 9/1998 | Gugler | | |
| 5,875,428 A | 2/1999 | Kurzweil et al. | | |
| 6,072,496 A | 6/2000 | Guenter et al. | | |
| 6,205,261 B1 | 3/2001 | Goldberg | | |
| 6,298,176 B2 * | 10/2001 | Longacre et al. | | 382/313 |
| 6,392,762 B1 | 5/2002 | Tsai et al. | | |
| 6,565,003 B1 * | 5/2003 | Ma | | 235/462.1 |
| 6,646,765 B1 | 11/2003 | Barker et al. | | |
| 6,758,399 B1 * | 7/2004 | Brunelli et al. | | 235/462.01 |
| 6,873,732 B2 | 3/2005 | Dance | | |
| 6,907,132 B1 * | 6/2005 | Salomon | | 382/101 |
| 6,970,592 B2 | 11/2005 | Fujimoto et al. | | |
| 7,391,917 B2 | 6/2008 | Ohta et al. | | |
| 7,418,126 B2 | 8/2008 | Fujimoto et al. | | |
| 7,551,753 B2 | 6/2009 | Kitora | | |
| 7,590,626 B2 | 9/2009 | Li et al. | | |
| 7,737,967 B2 | 6/2010 | Chernichenko et al. | | |
| 7,778,457 B2 | 8/2010 | Nepomniachtchi et al. | | |
| 7,957,023 B2 | 6/2011 | Matsuno | | |
| 2004/0193697 A1 * | 9/2004 | Grosvenor et al. | | 709/217 |
| 2006/0078214 A1 * | 4/2006 | Gallagher | | 382/254 |
| 2006/0210192 A1 * | 9/2006 | Orhun | | 382/275 |
| 2007/0172122 A1 * | 7/2007 | Kouno et al. | | 382/175 |
| 2007/0172123 A1 * | 7/2007 | Komatsubara et al. | | 382/175 |
| 2007/0228171 A1 * | 10/2007 | Thiyagarajah | | 235/462.09 |
| 2007/0297695 A1 * | 12/2007 | Aratani et al. | | 382/284 |
| 2009/0067756 A1 | 3/2009 | Meyer et al. | | |
| 2009/0245681 A1 * | 10/2009 | Kobayashi | | 382/275 |
| 2009/0316163 A1 * | 12/2009 | Hanawa | | 358/1.6 |

(Continued)

OTHER PUBLICATIONS

Bernardo F. Reis et al., Perspective Correction Implementation for Embedded (Marker-Based) Augmented Reality.

*Primary Examiner* — Wenpeng Chen
(74) *Attorney, Agent, or Firm* — Beacon Patent Intelligence LLC; Eugene H. Nahm

(57) ABSTRACT

The present disclosure concerns a method and system to accurately remove a three-dimensional distortion in an image of a document and convert the image into an accurate two dimensional image. A method for accurately deducing an image of a document to a precise document boundary is also disclosed. A portable computing device may employ the disclosed method and system. The methods involve a marker embedded in a document which provides three-dimensional positional information of a recording device with reference to the marker continuously in real time.

13 Claims, 8 Drawing Sheets

(56) References Cited

U.S. PATENT DOCUMENTS

| | | |
|---|---|---|
| 2010/0131841 A1 | 5/2010 | Saito |
| 2010/0149587 A1 | 6/2010 | Yoshida |
| 2011/0240740 A1* | 10/2011 | Li et al. .................. 235/462.09 |
| 2011/0285873 A1 | 11/2011 | Showering |
| 2011/0290880 A1* | 12/2011 | Cai et al. ....................... 235/437 |
| 2012/0062960 A1* | 3/2012 | Sonoda et al. ................. 358/448 |
| 2012/0069383 A1* | 3/2012 | Hine et al. .................... 358/1.14 |
| 2012/0121195 A1 | 5/2012 | Yadid et al. |
| 2012/0218444 A1 | 8/2012 | Stach |
| 2012/0274842 A1 | 11/2012 | Cordes |
| 2013/0308865 A1* | 11/2013 | Shibata ......................... 382/195 |
| 2014/0050409 A1* | 2/2014 | Constantinou et al. ....... 382/195 |

\* cited by examiner

ADJUSTING PERSPECTIVE DISTORTION OF AN IMAGE

BACKGROUND OF THE INVENTION

1. Field of the Invention

The present invention relates generally to the field of computer vision technique. More particularly, the present invention relates to a method and system for correcting three-dimensional distortion error.

2. Description of Related Art

Applications employing a portable computing device, such as a smart phone, are becoming increasingly popular to perform many different tasks due to their portability. An image reading technology and distortion correction method is among one of the applications available to the portable computing devices. With increasing popularity to portable computing devices, many office electronics including an image scanner are being replaced by such technologies.

Accurately correcting a perspective image into a flat image offers many practical uses. For example, capturing an image of a document with a smart phone may cause perspective distortion in the three-dimensional field. If the distortion is corrected accurately, one can benefit from having not to bother with the use of a conventional scanner. Nowadays, portable computing devices offer many practical advantages over other type of electronic devices mainly due to their portability.

One of the problems associated with currently available image scanning applications for portable computing devices is that many of the applications cause perspective distortion. In addition, currently available image scanning applications fail to accurately correct a perspective distortion and deduce page boundaries. In most instances, a relatively non-portable scanner is still being used for quality results.

Therefore, a need exists for a method for accurately correcting a three dimensional distortion of an image using a portable electronic device. A need also exists for a method for accurately calculating a document boundary, providing a high quality result to the users. A further need exists for a method not only allowing an accurate three dimensional distortion corrections and document boundary calculations but also performing such tasks in a speedy manner.

SUMMARY

The subject matter of this application may involve, in some cases, interrelated products, alternative solutions to a particular problem, and/or a plurality of different uses of a single system or article.

In one aspect, a method of correcting a three-dimensional distortion in a document image is provided. The method may begin with embedding a marker in the document wherein the marker includes predetermined marker orientation. A portable computing device may then capture an image that includes the document. The marker orientation represents a relative location of the portable computing device with reference to the document. The portable computing device identifies the marker orientation within the image of the document. Once identified, the portable computing device compares the marker orientation within the image of the document to the predetermined marker orientation in order to determine a transformation. The portable computing device applies the transformation to the captured image, thereby removing the three-dimensional distortion from the image.

In another aspect, a method of configuring a document boundary in an image of a document is provided. The method may begin by embedding a marker at a predetermined location in the document wherein the marker includes predetermined information relative to the size and shape of the document and to the marker orientation, location, size, and shape. The portable computing device may then capture a full image including an image of the document, followed by identifying a marker orientation of the marker within the image of the document. The portable computing device compares the identified marker orientation to the predetermined marker orientation to determine a transformation to remove a three-dimensional distortion from the image of the document. Once determined, the portable computing device identifies the document boundary within the full image by analyzing the transformation, the size and shape of the document, the marker location on the document, the marker size and shape.

DETAILED DESCRIPTION

The detailed description set forth below in connection with the appended drawings is intended as a description of presently preferred embodiments of the present invention and does not represent the only forms in which the present invention may be constructed and/or utilized. The description sets forth the functions and the sequence of steps for constructing and operating the present invention in connection with the illustrated embodiments.

The marker contemplated herein may be any type of visual marker capable of generating a marker orientation when viewed through a camera unit. The marker orientation provides a three-dimensional position information of the camera unit with reference to the marker. When the marker is viewed through a camera unit, a virtual three-dimensional projection of the marker may be presented on a display of a portable computing device. Such marker includes, but not limited to, an Augmented Reality frame marker.

The image contemplated herein may be any digital image format capable of being interpreted by a computer or computing device. Examples of image files contemplated herein include, but are not limited to JPEG, GIF, TIFF, PNG, Bitmap, RAW, PNM, WEBP, and the like.

The portable computing device contemplated herein may include, but are not limited to, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

The document contemplated herein may include but are not limited to, a paper document in any shape or size.

Figure 1:
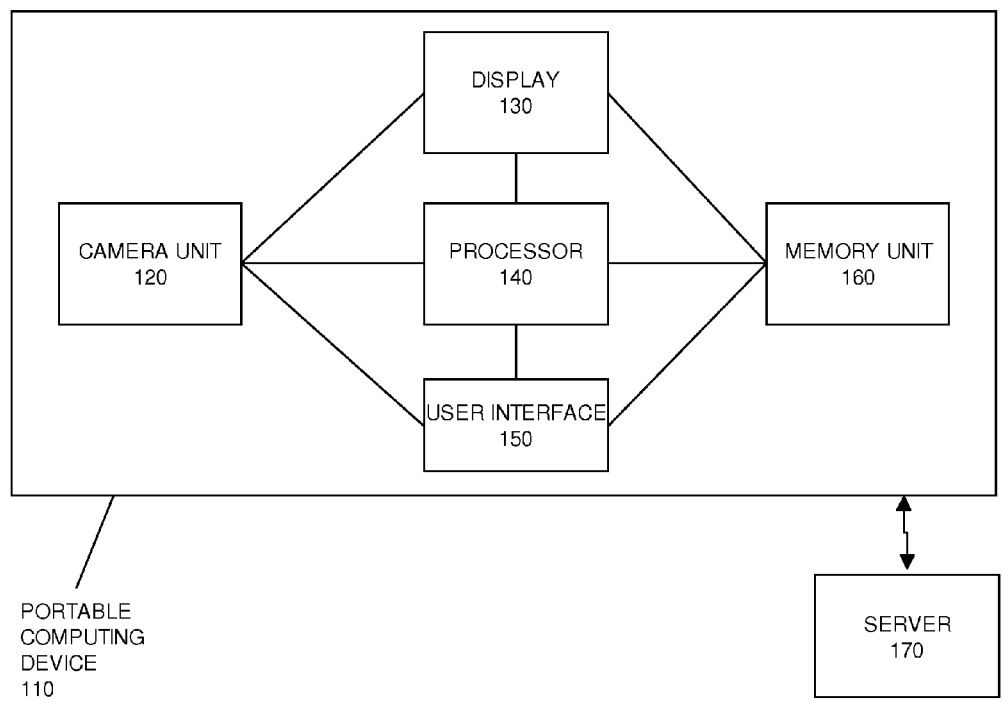
FIG. 1 provides a diagram describing a portable computing device.

An embodiment of a portable computing device, such as a smart phone, is shown in the simplified systemic diagram of FIG. 1. A portable computing device 110 includes a camera unit 120 configured to snap an image and/or record a video within its field of view. The camera unit 120 is in connection with a display 130, a processor 140, and a user interface 150. The display 130 may visually represent objects within the field of view to a user. In one embodiment, the display 130 may be in the form of a touch screen providing the user the user interface 150 on the display 130. The camera unit 120 may capture an image. The camera unit 120 is in communication with the processor 140 where the captured image may be analyzed to calculate a transformation. The camera unit 120 is further in communication with the display 130 and the user interface 150. A memory unit 160 may electronically communicate with the display 130, the processor 140, and the user interface 150. The memory unit 160 may store any type of input data. Lastly, the portable computing device 110 may communicate with a server 170 which enables a networking capability to the portable device 110. The networking capability includes, but not limited to, connecting to an internet.

Figure 2:
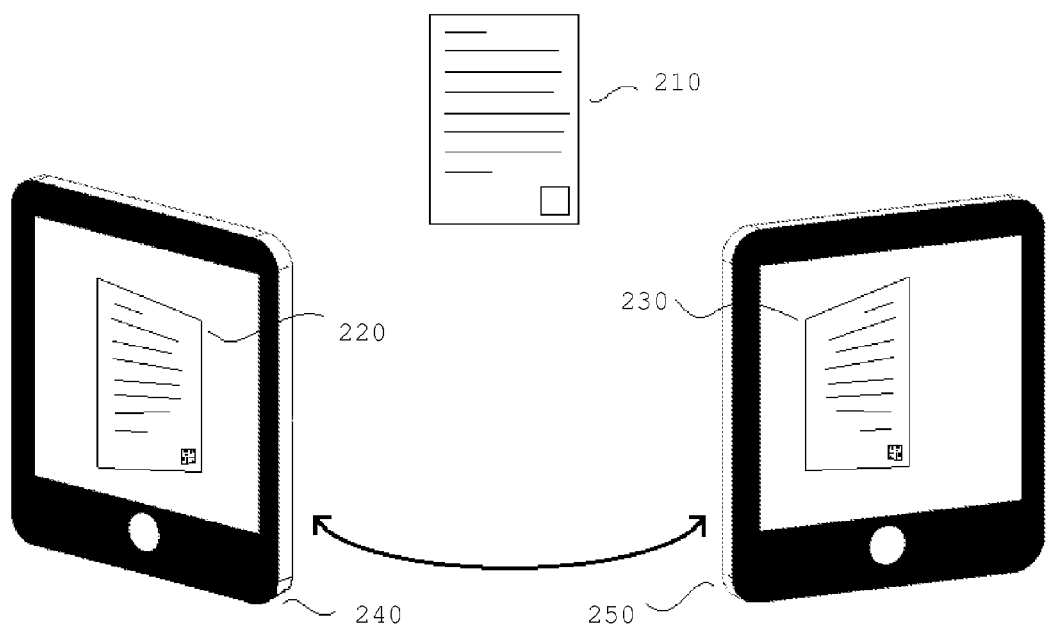
FIG. 2 provides an exemplary illustration showing how a three-dimensional distortion is caused.

FIG. 2 shows illustratively how a three-dimensional distortion may occur when viewing a document 210 through a portable computing device. The three-dimensional distortion may occur when the document 210 is viewed from a different angle or distance resulting in the three-dimensional distortion of the document 210. The three-dimensional distortion results from a non-parallel orientation of a plane of the document 210 relative to an image plane of the portable computing device. In one embodiment, the three-dimensional distortion of the document 210 is visible when the portable computing device is placed in two different positions 240 and 250. An image of a document 220 illustrates the three-dimensional distortion of the document 210 when the portable computing device is placed at the position 240. The image of the document 220 represents an illustration of a distorted document when the document 210 is viewed from left side of the document 210. Another image of a document 230 illustrates the three-dimensional distortion of the document 210 when the portable computing device is placed at the position 250. The image of the document 230 represents another illustration of a distorted document when the document 210 is viewed from right side of the document 210.

Correcting the three-dimensional distortion in an image of the document 210 requires adjusting the image of the document 210 in all three axes in a three-dimensional Cartesian coordinate system. In one embodiment, a correction of an image of a two-dimensional object, such as the document 210, in a three-dimensional space may require axial rotational maneuvers of the image in the three-dimensional Cartesian coordinate system, namely pitch, yaw, and roll. In addition, a size of the image of the document may need to be adjusted to compensate varying distance between the camera unit and the document 210 at the moment of an image capture. In order to accurately correct the three-dimensional distortion, the portable computing device may determine a relative three-dimensional location of the portable computing device with reference to the document 210 at the moment of the image capture.

Figure 3:
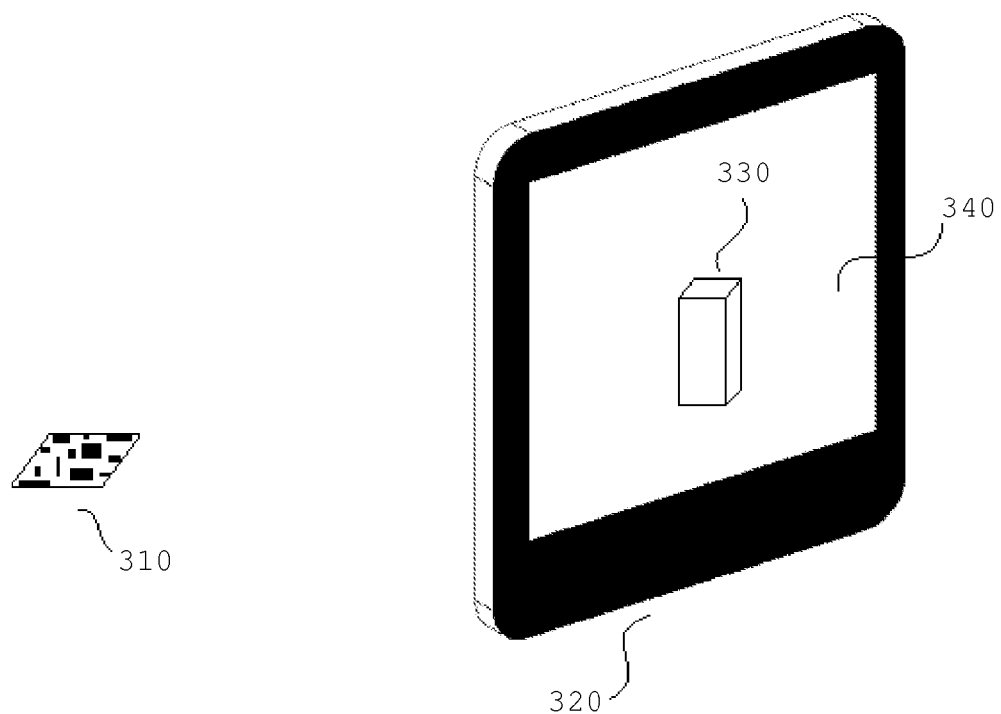
FIG. 3 provides an exemplary illustration showing a marker and the marker orientation of the marker.

FIG. 3 provides an illustration of a marker 310 in view via a portable computing device 320. A marker orientation 330 of the marker 310 may appear on a display 340, providing a user a three-dimensional location of the portable computing device 320 with reference to the marker 310. The marker orientation 330 is a three-dimensional virtual projection of the marker 310. The marker 310, which may be embedded within a document, is stationary and placed on a flat surface while the portable computing device 320 is in motion. When the portable device 320 is in motion, the marker orientation 330 may change its shape and/or size, visually representing a change in the three-dimensional location of the portable computing device 320 with reference to the marker 310.

In one embodiment, the user may capture an image of the marker orientation 330 in which the portable computing device calculates the three-dimensional location of the portable computing device by identifying the marker orientation 330. The marker orientation 330 is compared to a predetermined marker orientation which is a desired marker orientation, representing the three-dimensional location of the portable computing device where no three-dimensional distortion exists. In another embodiment, the portable computing device 320 may calculate and store its location in real-time by identifying the marker orientation 330. The marker orientation 330 changes its shape as the user moves the portable computing device 320. The portable computing device 320 may calculate and store its location in real-time with reference to the marker 310 by comparing the marker orientation 330 to the predetermined marker orientation as the user maneuvers the portable computing device 320.

Figure 4:
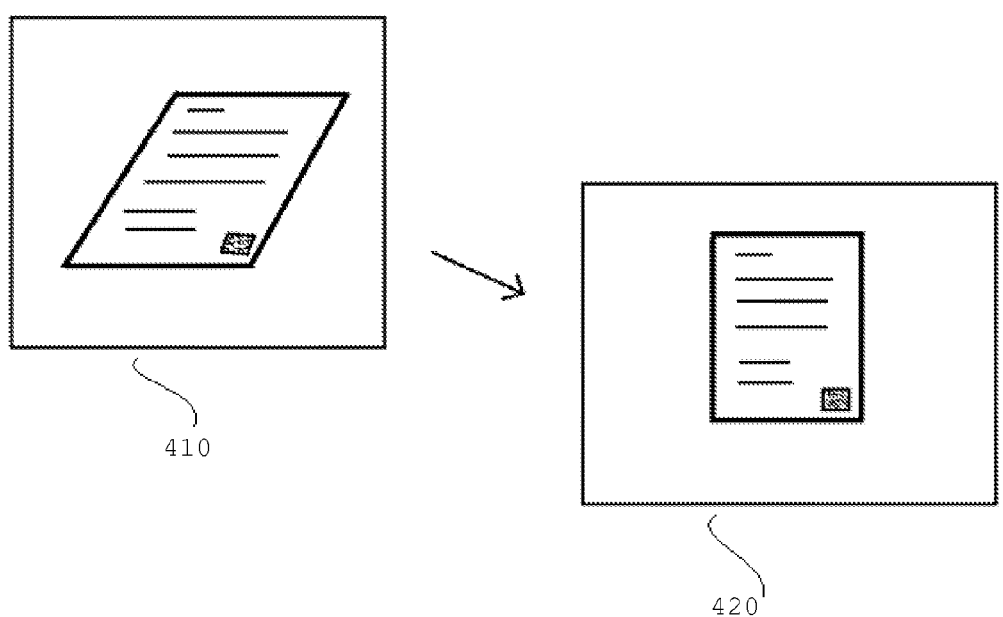
FIG. 4 provides a simplified diagram on a three-dimensional distortion correction of an image of a document.

FIG. 4 shows a simplified example of correcting a three-dimensional distortion in an image of a document. It shows the results of applying the method of the present disclosure to a three-dimensionally distorted image of the document 410. The portable computing device may adjust the three-dimensionally distorted image of the document 410 in a three-dimensional space to eliminate the three-dimensional distortion, resulting in a corrected image of the document 420. In one embodiment, the image of the document may be adjusted through axial rotational maneuvers of the image of the document in a three-dimensional Cartesian coordinate system, namely pitch, yaw, and roll. In addition, a size of the image of the document may need to be adjusted to compensate varying distance between a camera unit and the document.

Figure 5:
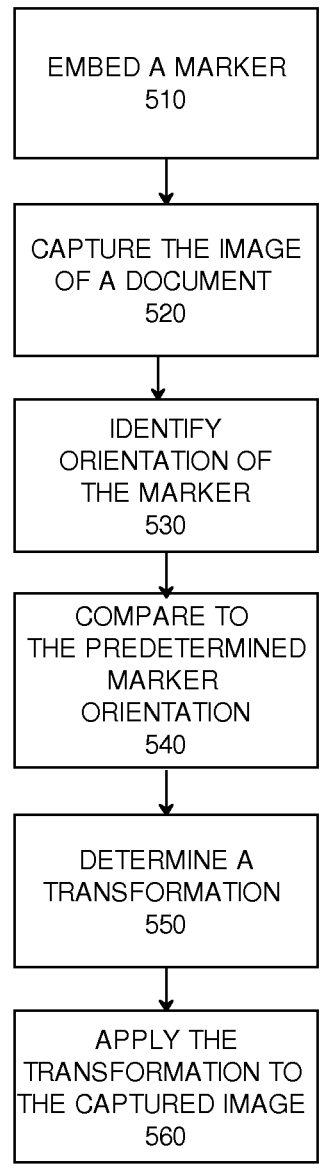
FIG. 5 provides a flowchart of a three-dimensional distortion correction method.

FIG. 5 shows an embodiment of correcting a three-dimensional distortion using a portable computing device in a flow diagram. First in the steps, a document may be embedded with a marker 510. The marker includes a predetermined marker orientation which represents a graphical projection of the marker where no three-dimensional distortion exists in an image of the document. A user then captures an image including the image of the document 520. The portable computing device identifies a marker orientation within the image of the document 530. At step 540, the portable computing device may compare the marker orientation within the image of the document to the predetermined marker orientation. A transformation may be determined by comparing the marker orientation within the image of the document to the predetermined marker orientation 550. The transformation may represent the three-dimensional distortion in angles along the x-y-z axes in a three-dimensional Cartesian coordinate system and a distortion in size of the image of the document resulting from varying distance between the portable computing device and the document. At step 560, the transformation is applied to the image including the image of the document, thereby removing the three-dimensional distortion in the image of the document.

Figure 6:
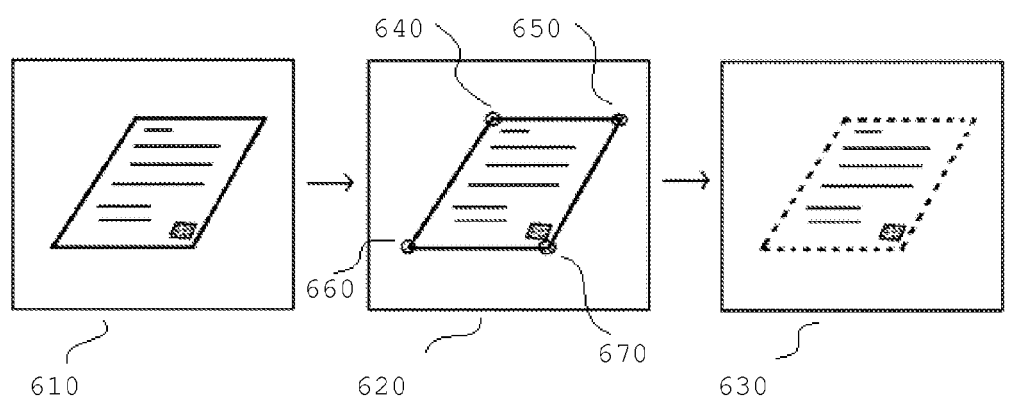
FIG. 6 provides a simplified diagram on how a document boundary is determined.

FIG. 6 illustrates a simplified process of determining a document boundary in an image of a document. At 610, an image of a document is captured. The image of the document 610 is three-dimensionally distorted. In one embodiment, at 620, the document boundary in the image of the document may be determined by identifying four corners 640 650 660

670 of the image of the document. Once the four corners of the image of the document are identified, the document boundary may be determined by enclosing lines surrounding the four corners of the image of the document as shown at 630. A portable computing device identifies the four corners of the image of the document by using a transformation and a predetermined information including, a size and shape of the document, a marker location on the document, a marker size, and a marker shape. Both the predetermined marker size and shape represents two-dimensional measurements of a marker in the document.

In one embodiment, the four corners 640 650 660 670 of the image of the document are identified by applying the transformation to the predetermined information. The transformation may be calculated by comparing a marker orientation within the image of the document to a predetermined marker orientation. The transformation entails a three-dimensional distortion in the image of the document with reference to the predetermined marker orientation. The three-dimensional distortion includes distortions in size of the image of the document and angles along all three axes in a three-dimensional Cartesian coordinate system. The transformation is applied to the predetermined information thereby correcting the three-dimensional distortion of the predetermined information associated to the image of the document.

In another embodiment, the four corners in the image of the document are identified by applying the transformation to a captured full image captured by the portable computing device. The captured full image includes the image of the document. The portable computing device calculates the transformation by comparing a marker orientation within the image of the document to a predetermined marker orientation. The transformation is applied to the captured full image removing a three-dimensional distortion in the image of the document. Then the portable computing device identifies the four corners of the transformed captured full image by calculating distances to each of the four corners in the transformed captured full image from a marker in the transformed captured full image by utilizing a predetermined information. The predetermined information includes a size and shape of the document, a marker location on the document, a marker size, and a marker shape. In one embodiment, the predetermined marker location on the document may be at a corner of the document. In another embodiment, the marker shape may be rectangular.

Figure 7:
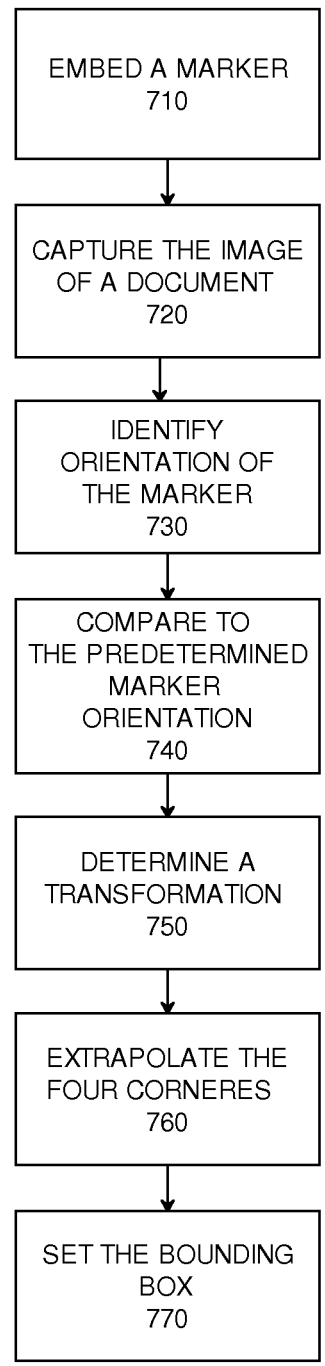
FIG. 7 provides a flow chart illustrating how a document boundary is determined.

FIG. 7 depicts a flow chart of determining a document boundary in an image of a document. In this embodiment, a marker may include a predetermined information relative to the document size and shape and to the marker location, orientation, size, and shape. The predetermined marker orientation represents a desired marker orientation of the marker where no three-dimensional distortion exists. First in the steps, the marker is embedded to the document 710 in a predetermined location. A portable computing device captures an image of a document 720 then identifies a marker orientation within the captured image of the document 730. The portable computing device compares the marker orientation within the captured image of the document to the predetermined marker orientation 740 to determine a transformation 750 which represents a distortion in size of the image of the document and a three-dimensional distortion in angles along the x-y-z axes in a three-dimensional Cartesian coordinate system. Four corners are extrapolated by applying the transformation to the captured image of the document 760. Finally, the document boundary is formed connecting the four corners 770 in the captured image of the document.

In one embodiment, the portable computing device may isolate the transformed captured image of the document by cropping inside a region defined by the document boundary. A resulting image has no three-dimensional distortion and deduced within the document boundary. A user may choose to send the resulting image to a server in communication with the portable computing device wherein the resulting image may be converted to a text data using an optical character recognition technique. Such technique is well known to those of ordinary skill in the art.

Figure 8:
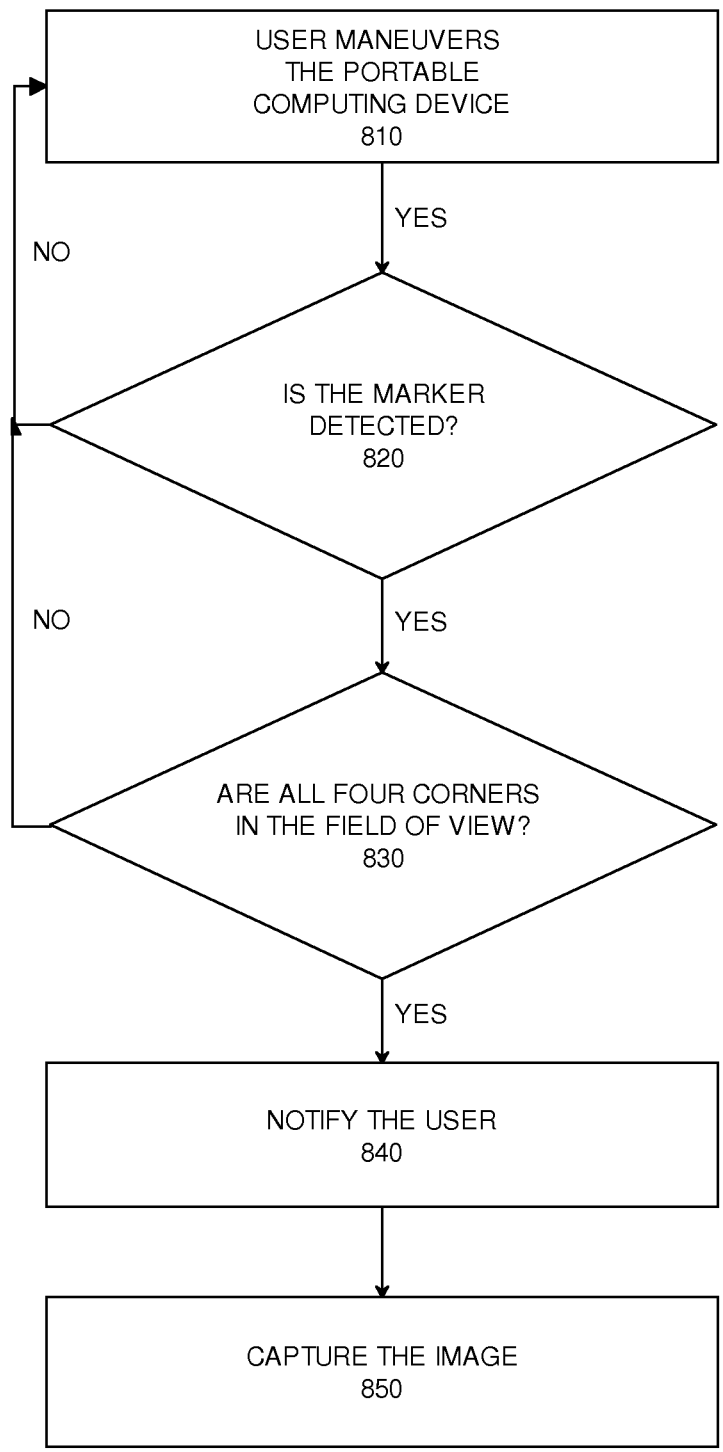
FIG. 8 provides a flow chart describing a user manual operation of the proposed method.

FIG. 8 shows a flow diagram of a manual user operation of the present invention. In this embodiment, a user maneuvers a portable computing device 810 facing a camera unit towards a document from an elevated position. At step 820, the portable computing device searches for a marker while the user maneuvers the portable computing device. Once the marker is detected by the camera unit, a transformation is calculated in real-time following the methods contemplated in the present disclosure. Each frame captured from the camera unit is instantly analyzed by the portable computing device to confirm whether all four corners of the document are within a field of view 830. The user may continue to maneuver the portable computing device until the marker is detected and the four corners are within the field of view on a display of the portable computing device. At step 840, the portable computing device may notify the user 840 when both conditions are satisfied. At step 850, the user may take an image of the document using a user interface.

In another embodiment, the portable computing device may be placed on an elevated plane parallel to the document wherein the document is placed on a flat surface below the elevated plane. The camera unit is placed pointing towards the document. The portable computing device may automatically capture the image of the document when the marker is detected and all four corners of the document are within the field of view. The user may replace the document with another document in order to continue the process. The portable computing device may notify the user once the image of the document is sent to a memory unit within the portable computing device or to a server in connection with the portable computing device.

In a further embodiment, a document code number may be embedded in the marker which may be identified by the portable computing device when the marker is detected. The user assigns the document code number to the marker. The document code number may be associated to various predetermined information including the document size, the marker location, size, and shape. In one embodiment, once the marker is detected, the portable computing device may identify the predetermined information associated to the document code number by communicating with a server where the predetermined information may be stored.

While several variations of the present invention have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present invention, and are inclusive, but not limited to the following appended claims as set forth.

What is claimed is:
1. A method of correcting a three-dimensional distortion in an image of a document comprising the steps of:
    embedding a marker in the document, the marker including a predetermined marker orientation;

capturing a full image that includes the image of the document, a marker orientation appearing in the captured full image, wherein the marker when captured in the full image is virtually altered to appear as the marker orientation, the marker orientation being a three-dimensional virtual projection of the marker and appearing in place of the marker;

identifying the marker orientation of the marker within the image of the document;

comparing the marker orientation of the marker within the image of the document to the predetermined marker orientation, wherein the predetermined marker orientation is a desired marker orientation, representing the marker orientation without the three-dimensional distortion;

determining a transformation to remove the three-dimensional distortion in the image of the document; and applying the transformation to the captured full image.

2. The method of correcting a three-dimensional distortion in an image of a document of claim 1 wherein the step of identifying the marker orientation of the marker within the image of the document comprises identifying the marker orientation in real-time.

3. The method of correcting a three-dimensional distortion in an image of a document of claim 1 wherein the marker orientation is cuboidal.

4. A method of determining a document boundary in an image of a document comprising the steps of:

embedding a marker at a predetermined location in the document, the marker including a predetermined information relative to the document size and shape, and to the marker orientation, location, size and shape;

capturing a full image that includes the image of the document, a marker orientation appearing in the captured full image, wherein the marker when captured in the full image is virtually altered to appear as the marker orientation, the marker orientation being a three-dimensional virtual projection of the marker and appearing in place of the marker;

identifying the marker orientation of the marker within the image of the document;

comparing the marker orientation of the marker within the image of the document to a predetermined marker orientation, wherein the predetermined marker orientation is a desired marker orientation, representing the marker orientation without a three-dimensional distortion;

determining a transformation to remove the three-dimensional distortion from the image of the document; and identifying the document boundary within the captured full image on the basis of at least the transformation, the document size and shape, the marker location, size, and shape.

5. The method of determining a document boundary in an image of a document of claim 4 further comprising the steps of:

applying the transformation to the captured full image; and isolating a transformed image of the document by cropping inside a region defined by the document boundary within the transformed captured full image.

6. The method of determining a document boundary in an image of a document of claim 4 further comprising the steps of:

isolating the image of the document by cropping inside a region defined by the document boundary within the captured full image; and applying the transformation to the isolated image of the document.

7. The method of claim 6 further comprising the step of converting the transformed isolated image of the document to a text data using an optical character recognition technique.

8. The method of determining a document boundary in an image of a document of claim 4 further comprising the step of embedding a document code number in the marker.

9. The method of determining a document boundary in an image of a document of claim 4 wherein the marker shape is rectangular.

10. The method of determining a document boundary in an image of a document of claim 4 wherein the step of embedding a marker at a predetermined location in the document comprises embedding the marker at a corner of the document.

11. The method of determining a document boundary in an image of a document of claim 4 wherein the document shape is rectangular.

12. The method of determining a document boundary in an image of a document of claim 4 wherein the step of identifying the marker orientation of the marker within the image of the document comprises identifying the marker orientation in real-time.

13. The method of determining a document boundary in an image of a document of claim 4 wherein the marker orientation is cuboidal.

* * * * *